United States Patent
Kim et al.

(10) Patent No.: US 12,401,070 B2
(45) Date of Patent: Aug. 26, 2025

(54) BMS WAKEUP DEVICE AND METHOD

(71) Applicant: LG ENERGY SOLUTION, LTD., Seoul (KR)

(72) Inventors: Jeong Wook Kim, Daejeon (KR); Seog Jin Yoon, Daejeon (KR); Seung Jin Noh, Daejeon (KR); Hyo Seong An, Daejeon (KR); Won Hoe Lee, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 849 days.

(21) Appl. No.: 17/633,404

(22) PCT Filed: Oct. 30, 2020

(86) PCT No.: PCT/KR2020/014978
§ 371 (c)(1),
(2) Date: Feb. 7, 2022

(87) PCT Pub. No.: WO2021/096116
PCT Pub. Date: May 20, 2021

(65) Prior Publication Data
US 2022/0294034 A1 Sep. 15, 2022

(30) Foreign Application Priority Data
Nov. 15, 2019 (KR) .......................... 10-2019-0146382

(51) Int. Cl.
*H01M 10/42* (2006.01)
*H01M 10/44* (2006.01)
(Continued)

(52) U.S. Cl.
CPC ..... *H01M 10/4257* (2013.01); *H01M 10/443* (2013.01); *H01M 10/46* (2013.01);
(Continued)

(58) Field of Classification Search
CPC .......... H01M 10/4257; H01M 10/443; H01M 10/46; H01M 10/486; H01M 10/48;
(Continued)

(56) References Cited

U.S. PATENT DOCUMENTS

| | | |
|---|---|---|
| 5,477,130 A | 12/1995 | Hashimoto et al. |
| 2007/0257635 A1 | 11/2007 | Yang |

(Continued)

FOREIGN PATENT DOCUMENTS

| | | |
|---|---|---|
| CN | 101083402 A | 12/2007 |
| CN | 101425693 A | 5/2009 |

(Continued)

OTHER PUBLICATIONS

English translation of JP2013188088.*

(Continued)

*Primary Examiner* — Kiran Quraishi Akhtar
(74) *Attorney, Agent, or Firm* — Morgan, Lewis & Bockius LLP

(57) ABSTRACT

A battery pack according to an embodiment of the present invention includes a (+) output terminal of the battery pack, a (−) output terminal of the battery pack, a (−) line connecting the (−) output terminal to a (−) terminal of a battery cell constituting the battery pack, a pre-charge FET provided on the (−) line, a system contact terminal configured to check whether the external system is connected, a battery management system (BMS), and a charge/discharge FET configured to charge or discharge the battery pack under a control of the BMS, wherein the pre-charge FET and the charge/discharge FET are connected in parallel.

4 Claims, 3 Drawing Sheets

(51) Int. Cl.
*H01M 10/46* (2006.01)
*H01M 10/48* (2006.01)
*H02J 7/00* (2006.01)

(52) U.S. Cl.
CPC ......... *H01M 10/486* (2013.01); *H02J 7/0063* (2013.01); *H01M 2010/4271* (2013.01)

(58) Field of Classification Search
CPC ......... H01M 10/44; H01M 2010/4271; H01M 2220/30; H02J 7/0063; H02J 7/00304; H02J 7/0036; H02J 7/0047; H02J 7/0068; H02J 7/00; Y02E 60/10
See application file for complete search history.

(56) References Cited

U.S. PATENT DOCUMENTS

| | | |
|---|---|---|
| 2009/0087722 A1 | 4/2009 | Sakabe et al. |
| 2009/0111005 A1 | 4/2009 | Hur |
| 2012/0286575 A1 | 11/2012 | Park et al. |
| 2013/0234508 A1 | 9/2013 | Eisele et al. |
| 2015/0219720 A1 | 8/2015 | Huh |
| 2015/0222117 A1 | 8/2015 | Im |
| 2018/0015833 A1 | 1/2018 | Namou et al. |
| 2018/0115178 A1 | 4/2018 | Moon et al. |
| 2019/0067957 A1 | 2/2019 | Yeom |
| 2019/0280341 A1 | 9/2019 | Li |
| 2020/0052346 A1 | 2/2020 | Park |
| 2021/0143485 A1 | 5/2021 | Kim |

FOREIGN PATENT DOCUMENTS

| | | | |
|---|---|---|---|
| CN | 103069641 A | 4/2013 | |
| CN | 208782521 U | 4/2019 | |
| CN | 110226258 A | 9/2019 | |
| EP | 1 855 368 A2 | 11/2007 | |
| JP | 2000-060006 A | 2/2000 | |
| JP | 2009-089487 A | 4/2009 | |
| JP | 2009-112192 A | 5/2009 | |
| JP | 2010-193558 A | 9/2010 | |
| JP | 2013188088 * | 9/2013 | ............... B60L 3/00 |
| JP | 2013188088 A | 9/2013 | |
| JP | 2014-045551 A | 3/2014 | |
| JP | 5768780 B2 | 8/2015 | |
| JP | 2015-173569 A | 10/2015 | |
| KR | 10-20140025627 A | 3/2014 | |
| KR | 10-20150091890 A | 8/2015 | |
| KR | 10-1741643 B1 | 6/2017 | |
| KR | 10-20170060406 A | 6/2017 | |
| KR | 101741643 * | 6/2017 | ......... H01M 10/425 |
| KR | 10-20180045954 A | 5/2018 | |
| KR | 10-20180053843 A | 5/2018 | |
| KR | 10-2018-0093322 A | 8/2018 | |
| KR | 10-20180087013 A | 8/2018 | |
| KR | 10-20190051477 A | 5/2019 | |
| WO | 2019/078589 A1 | 4/2019 | |

OTHER PUBLICATIONS

English translation of KR101741643.*
International Search Report and Written Opinion issued in corresponding International Patent Application No. PCTKR2020/014978, dated Oct. 30, 2020.
Office Action issued Jun. 17, 2023, in corresponding Chinese Patent Application No. 202080020236.5.
Extended European Search Report dated May 25, 2022 issued by the European Patent Office in corresponding European Patent Application No. 20886278.9.
Office Action dated Oct. 11, 2022, issued by the Japanese Patent Office in corresponding Japanese Patent Application No. 2021-556598.

* cited by examiner

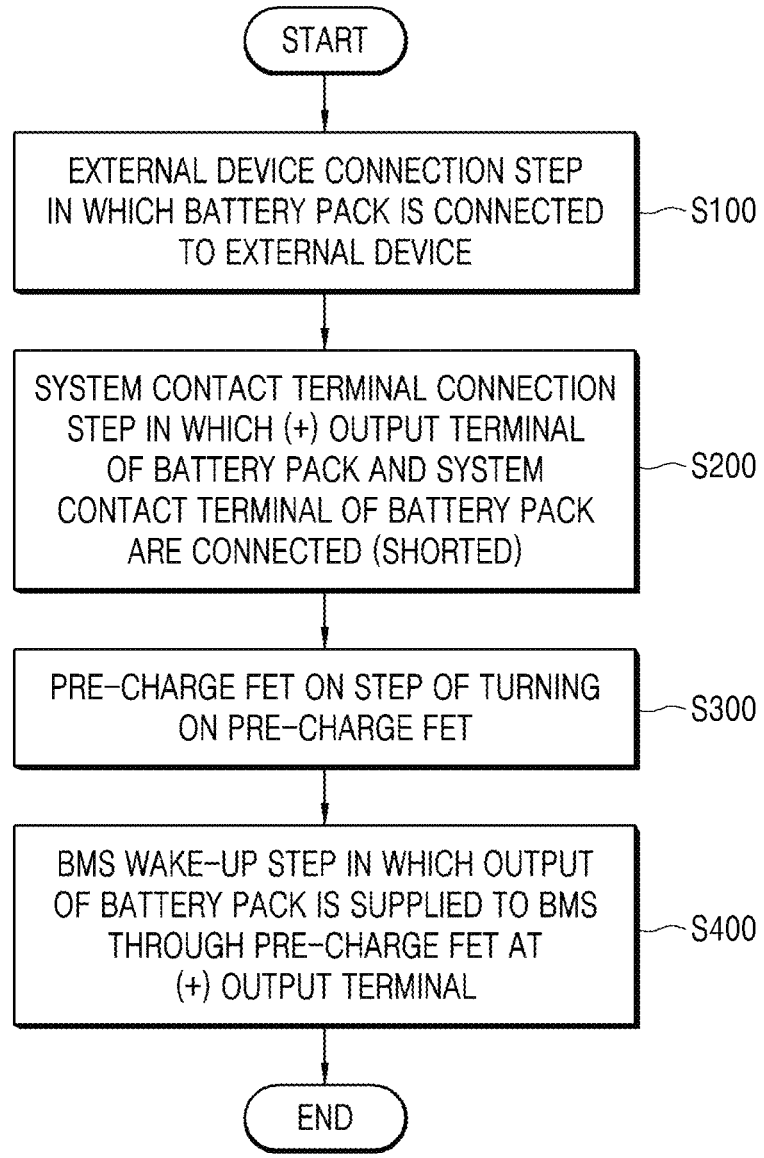

BMS WAKEUP DEVICE AND METHOD

TECHNICAL FIELD

The present invention relates to a device and method for waking up a BMS using the power of a battery itself without applying power from the outside.

BACKGROUND ART

In recent years, as the demand for portable electronic products such as laptops, video cameras, and portable phones is rapidly increasing, and the development of energy storage batteries, robots, satellites, and the like begins in full swing, research on a high-performance secondary battery capable of repetitive charging and discharging is actively being conducted.

Currently commercialized secondary batteries include nickel cadmium batteries, nickel hydride batteries, nickel zinc batteries, and lithium secondary batteries, and among them, lithium secondary batteries are in the spotlight due to their advantages such as free charging and discharging, a very low self-discharge rate, and high energy density, as a memory effect rarely occurs compared to nickel-based secondary batteries.

Battery packs are used in various fields, and often require large capacity, such as electric powered vehicles or smart grid systems. In order to increase the capacity of the battery pack, there may be a method of increasing the capacity of the secondary battery, that is, the battery cell itself but in this case, the effect of increasing the capacity is not large, and there is a disadvantage in that there is a physical limitation on the size expansion of the secondary battery. Therefore, in general, a battery pack in which a plurality of battery modules are connected in series and in parallel is widely used.

These battery packs often include a battery management system (BMS) that manages battery modules. Furthermore, the BMS monitors the temperature, voltage, and current of the battery module, and controls the balancing operation, cooling operation, charging operation or discharging operation of the battery pack based on the monitored battery module state.

In particular, a large number of battery packs, such as the BMS provided in a 12V lithium battery pack, can operate by receiving power from a battery module included in the battery pack. However, in the case of such a configuration, even if the value is small due to the current consumption of the BMS, there is a problem of consuming power of the battery pack.

In order to solve this problem, a technique has been proposed in which the BMS is not always turned on and is turned on only when its operation is required. However, in this case, when the operation of the BMS is required, for example, a technique for waking up the BMS when connected to an external device is required.

But, in order to apply separate power from the outside, the conventional circuit implementing the BMS wake-up technology has a disadvantage in that complex circuits such as 12V Aux-related circuits, connectors, and charge pumps are used.

Therefore, in the present invention, when the battery is connected to an external device to solve this disadvantage, suggested is a device and method for waking up the BMS with only the power source of the battery.

(Patent Document 0001) Korean Laid-Open Patent Publication No. 10-2019-0051477

DISCLOSURE

Technical Problem

The present invention provides a device and method for waking up a BMS only with a power source from a battery when the battery is connected to an external device.

Technical Solution

A battery pack according to an embodiment of the present invention includes a (+) output terminal of the battery pack, a (−) output terminal of the battery pack, a (−) line connecting the (−) output terminal to a (−) terminal of a battery cell constituting the battery pack, a pre-charge FET provided on the (−) line, a system contact terminal configured to check whether the external system is connected, a battery management system (BMS), and a charge/discharge FET configured to charge or discharge the battery pack under a control of the BMS, wherein the pre-charge FET and the charge/discharge FET are connected in parallel.

When the battery pack and the external device are connected, the (+) output terminal of the battery pack and the system contact terminal of the battery pack may be electrically connected due to a short member provided in the external device.

When the (+) output terminal and the system contact terminal are connected (shorted) through the short member, the pre-charge FET may be turned on, wherein when the pre-charge FET is turned on, a voltage of the battery pack is supplied to the BMS through the (+) output terminal and the pre-charge FET, so that the BMS may wake up.

After the BMS wakes up, the BMS turns off the pre-charge FET.

After the BMS wakes up, the BMS may check voltage, current, and temperature of the battery, and turn on the charge/discharge FET when all of the voltage, current, and temperature are not abnormal.

The external device may be any one of a mobile phone, a tablet computer, a notebook computer, a power tool, a wearable electronic device, and a power storage device, in which the battery pack is mounted.

A method of waking up a battery management system (BMS) of a battery pack according to an embodiment of the present invention includes an external device connection step in which the battery pack is connected to an external device, a system contact terminal connection step in which a (+) terminal of the battery pack and a system contact terminal of the battery pack are connected (shorted) while the battery pack is connected to the external device, a pre-charge FET on step in which the (+) terminal of the battery pack and the system contact terminal are connected in the system contact terminal connection step to turn on a pre-charge FET, and a BMS wake-up step in which when the pre-charge FET of the battery pack is turned on, an output of the battery pack is supplied to the BMS through the pre-charge FET at the (+) terminal to wake up the BMS.

In the system contact terminal connection step, the (+) terminal of the battery pack and the system contact terminal of the battery pack may be connected by a short member provided in the external device.

After the BMS wakes up in the BMS wake-up step, the BMS may perform a pre-charge FET off step of turning off the pre-charge FET.

After the BMS wakes up in the BMS wake-up step, the BMS may perform a battery state measurement step of measuring voltage, current, and temperature of the battery pack, so that when the voltage, current, and temperature of the battery pack measured in the battery state measurement step are within a normal range, the charge/discharge FET on step of turning on the charge/discharge FET is performed.

Advantageous Effects

In the present invention, when the battery is connected to an external device, a separate wake-up circuit is not required because the BMS can be wake-up only with the power source of the battery.

In addition, since the present invention does not require a separate wake-up circuit, the utility of the internal space of the battery can be improved.

DESCRIPTION OF DRAWINGS

FIG. 3 is a flowchart illustrating a BMS wake-up method of a battery pack according to an embodiment of the present invention.

MODE FOR INVENTION

Figure 1:
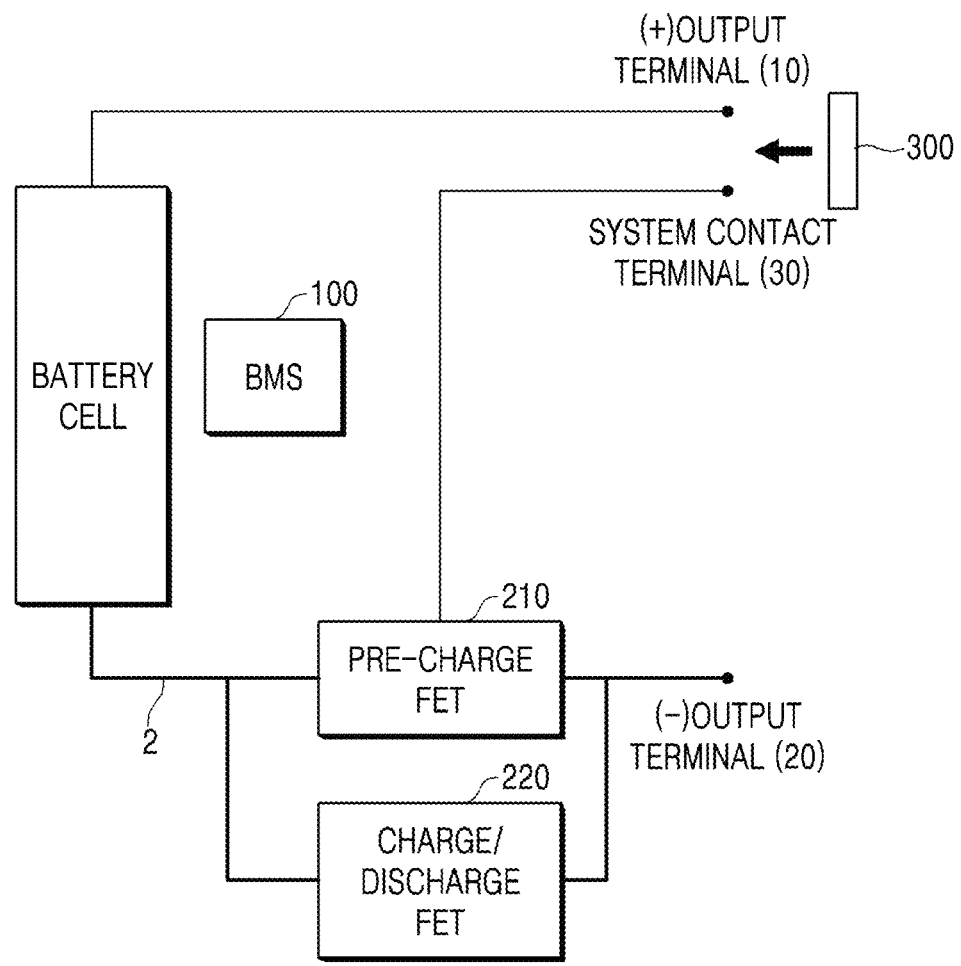
FIG. 1 is a view showing a battery pack according to an embodiment of the present invention.

Hereinafter, embodiments of the present invention will be described in detail with reference to the accompanying drawings so that those of ordinary skill in the art may easily implement the present invention. However, the present invention may be implemented in various forms and is not limited to the embodiments described herein. In the drawings, parts irrelevant to the description are omitted in order to clearly describe the present invention, and like reference numerals refer to like elements throughout the specification.

Terms including ordinal numbers, such as first and second, may be used to describe various elements, but the elements are not limited by the terms. The above terms are used only to distinguish one component from another. For example, a first component may be referred to as a second component and vice versa without departing from the scope of the present invention. The terms used in the present application are used only to describe specific embodiments, and are not intended to limit the present invention. The terms of a singular form may include plural forms unless otherwise specified.

Throughout the specification, when one part is "connected" to another part, this includes not only "directly connected" cases, but also "electrically connected" cases with other elements therebetween. In addition, when a certain part "includes" a certain component, it means that other components may be further included rather than excluding other components unless otherwise stated. As used throughout the present specification, the term "-ing step" or "a step of -ing" does not mean "a step for -ing".

As for terms used in the present invention, general terms that are currently widely used as possible are selected while considering functions in the present invention, but this may vary depending on the intentions or precedents of those skilled in the art, and the emergence of new technologies. In addition, in certain cases, there are terms arbitrarily selected by the applicant, and in this case, the meaning of the terms will be described in detail in the description of the corresponding invention. Therefore, the terms used in the present invention should be defined based on the meaning of the term and the overall contents of the present invention, not a simple name of the term.

1. Battery Pack According to Embodiment of Present Invention

FIG. 1 is a view showing a battery pack according to an embodiment of the present invention.

Hereinafter, a battery pack according to an embodiment of the present invention will be described with reference to FIG. 1.

A battery pack according to an embodiment of the present invention may be configured to include a (+) output terminal 10 of the battery pack, a (−) output terminal 20 of the battery pack, a (−) line 2 connecting the (−) output terminal 20 and the (−) terminal of a battery cell constituting the battery pack, a pre-charge FET 210 provided on the (−) line 2, a system contact terminal 30 that checks whether an external system is connected, a Battery Management System (BMS) 100 and, a charge/discharge FET 220 that charges or discharges the battery pack under the control of the BMS 100.

Specifically, in relation to a battery pack according to an embodiment of the present invention, when the battery pack and external device are connected, due to a short member 300 provided in the external device, the (+) output terminal 10 of the battery pack and the system contact terminal 30 of the battery pack are electrically connected (shorted) so that the BMS 100 may wake up.

For example, the short member 300 provided in the external device is formed in a rod shape of a conductive material and in addition, one end of the short member 300 may contact the (+) output terminal 10 of the battery pack, and the other end may contact the system contact terminal 30 of the battery pack. Meanwhile, the rest of the short member 300 except for one end and the other end may be wrapped with an insulating member.

On the other hand, in relation to the battery pack according to an embodiment of the present invention, when the (+) output terminal 10 of the battery pack and the system contact terminal 30 are connected (shorted) through the short member 300 provided in the external device, the pre-charge FET 210 may be turned on.

And, when the pre-charge FET 210 is turned on, the voltage of the battery pack is supplied to the BMS 100 through the (+) output terminal 10 and the pre-charge FET 210 so that the BMS 100 may wake up.

In other words, when the (+) output terminal 10 of the battery pack and the system contact terminal 30 are connected (shorted) through the short member 300, the power path connected in the (+) output terminal 10 of the battery pack->the short member 300->the system contact terminal 30->the pre-charge FET 210->the BMS 100 is formed so that it is possible to wake up the BMS 100 without a separate external power source.

Meanwhile, the external device may be any one of a mobile phone, a tablet computer, a notebook computer, a power tool, a wearable electronic device, and a power storage device, in which the battery pack is mounted.

Meanwhile, the BMS 100 may turn off the pre-charge FET 210 after the BMS 100 wakes up.

And, after the BMS 100 wakes up, the BMS 100 may check the voltage, current, and temperature of the battery, and when there is no abnormality in all of the voltage, current, and temperature, turn on the charge/discharge FET 220.

Accordingly, the battery pack may wake up without a separate power supply from the outside, and normally perform charging/discharging.

2. Battery Pack According to Another Embodiment of Present Invention

Figure 2:
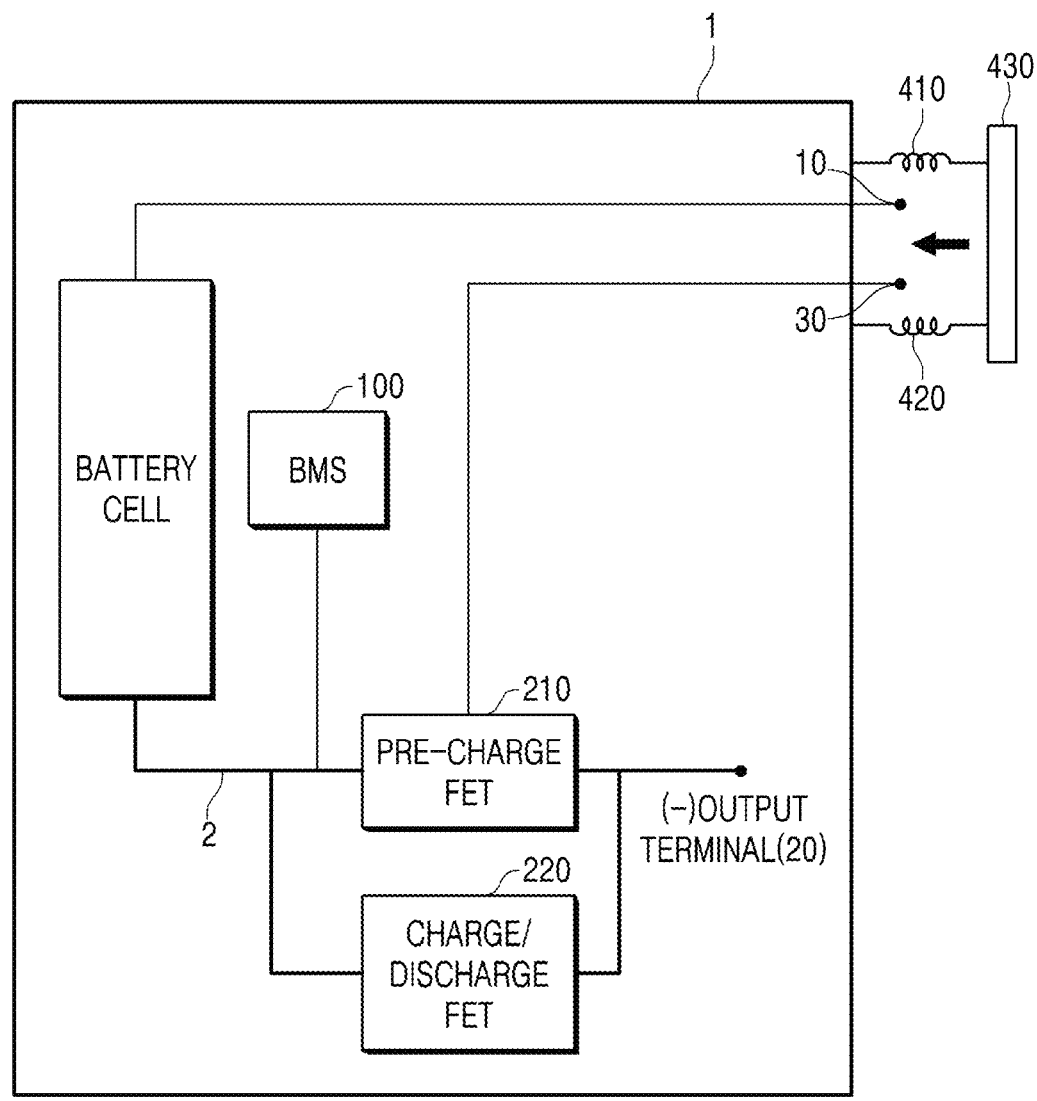
FIG. 2 is a view showing a battery pack according to another embodiment of the present invention.

FIG. 2 is a view showing a battery pack according to another embodiment of the present invention.

Hereinafter, a battery pack according to another embodiment of the present invention will be described with reference to FIG. 2.

A battery pack according to another embodiment of the present invention includes all the configurations of the battery pack of the present invention described above, and includes a short member inside the battery pack.

Specifically, a battery pack according to an embodiment of the present invention may be configured to include a (+) output terminal 10 of the battery pack, a (−) output terminal 20 of the battery pack, a (−) line 2 connecting the (−) output terminal 20 and the (−) terminal of a battery cell constituting the battery pack, a pre-charge FET 210 provided on the (−) line 2, a system contact terminal 30 that checks whether an external system is connected, a Battery Management System (BMS) 100, a charge/discharge FET 220 that charges or discharges the battery pack under the control of the BMS 100, and a short part.

On the other hand, in the battery pack according to another embodiment of the present invention, other configurations and operations except for the short part are the same as those of the battery pack according to the embodiment of the present invention, so detailed descriptions are omitted.

Hereinafter, only the structure and operation of the short member of the battery pack according to another embodiment of the present invention will be described.

The short part according to another embodiment of the present invention may include a first support 410 located next to the (+) output terminal of the battery pack, a second support 420 located next to the system contact terminal, a short bar 430 supported by the first and second supports 410 and 420, and made of a conductive material.

The first and second supports 410 and 420 are formed of a material that can be contracted/expanded by an external pressing pressure, and when pressing pressure is applied from the outside, one end of the short bar 430 may contact the (+) output terminal 10 of the battery pack, and the other end of the short bar 430 may contact the system contact terminal 30.

For example, the first support 410 may be composed of a first spring, and one end of the first spring may be fixed around the battery pack case in which the (+) output terminal of the battery pack is formed, and the other end may be connected to one end of the short bar, and the second support 420 may be composed of a second spring, and one end of the second spring may be fixed around a battery pack case in which the system contact terminal is formed, and the other end may be connected to the other end of the short bar.

Meanwhile, in relation to the short bar, when a battery is connected to an external device and a pressing pressure is applied to the short bar 430 by the external device, the first and second members contract, and as a result, the short bar 430 contacts the (+) output terminal 10 and the system contact terminal 30 of the battery pack.

In other words, when the (+) output terminal 10 of the battery pack and the system contact terminal 30 are connected (shorted) through the short bar 430, the power path connected in the (+) output terminal 10 of the battery pack->the short bar 430->the system contact terminal 30->the pre-charge FET 210->the BMS 100 is formed so that it is possible to wake up the BMS 100 without a separate external power source.

Meanwhile, the short bar 430 may be wrapped with an insulating member except for a portion corresponding to the (+) output terminal and a portion corresponding to the system contact terminal of the battery pack.

3. BMS Wake-Up Method of Battery Pack According to Embodiment of Present Invention FIG. 3 is a flowchart illustrating a BMS wake-up method of a battery pack according to an embodiment of the present invention.

Hereinafter, a BMS wake-up method of a battery pack according to an embodiment of the present invention will be described with reference to FIG. 3.

The BMS wake-up method of a battery pack according to an embodiment of the present invention may be configured to include an external device connection step S100 in which the battery pack is connected to an external device, a system contact terminal connection step S200 in which the (+) terminal of the battery pack and the system contact terminal of the battery pack are connected (shorted) while the battery pack is connected to an external device, a pre-charge FET on step S300 in which the (+) terminal of the battery pack and the system contact terminal are connected to turn on the pre-charge FET in the system contact terminal connection step, and a BMS wake-up step S400 in which when the pre-charge FET of the battery pack is turned on, the output of the battery pack is supplied to the BMS through the pre-charge FET at the (+) terminal.

Specifically, the system contact terminal connection step S200 is a step in which the (+) terminal of the battery pack and the system contact terminal of the battery pack are connected by a short member.

For example, the short member is formed in a rod shape of a conductive material and in addition, one end of the short member may contact the (+) output terminal of the battery pack, and the other end may contact the system contact terminal of the battery pack. In addition, the rest of the part except for the one end and the other end may be wrapped with an insulating member.

In addition, when the (+) output terminal of the battery pack and the system contact terminal are connected (shorted) through the short member, the pre-charge FET on step may be performed.

And when the pre-charge FET on step S300 is performed, a BMS wake-up step in which a voltage of a battery pack is supplied to the BMS through the (+) output terminal and the pre-charge FET may be performed to wake up the BMS.

In other words, when the (+) output terminal of the battery pack and the system contact terminal are connected (shorted) through the short member, a power path connected in the battery pack's (+) output terminal->the system contact terminal->the pre-charge FET->the BMS is formed, so that the BMS can wake up.

Meanwhile, after the BMS wakes up in the BMS wake-up step S400, the BMS may perform a pre-charge FET off step of turning off the pre-charge FET.

In addition, after the BMS wakes up in the BMS wake-up step S400, the BMS may perform a battery state measurement step of measuring voltage, current, and temperature of the battery pack, and when the voltage, current, and temperature of the battery pack measured in the battery state measurement step are within the normal range, perform a charge/discharge FET on step of turning on the charge/discharge FET.

On the other hand, although the technical idea of the present invention has been specifically described according to the above embodiment, it should be noted that the above embodiments are for the purpose of explanation and not limitation. In addition, those skilled in the art in the technical field of the present invention will be able to understand that various embodiments are possible within the scope of the spirit of the present invention.

What is claimed is:

1. A battery pack in which a battery management system (BMS) is configured to wake up after being connected to an external system, the battery pack comprising:
    a (+) output terminal of the battery pack;
    a (−) output terminal of the battery pack;
    a (−) line connecting the (−) output terminal to a (−) terminal of a battery cell constituting the battery pack;
    a pre-charge field-effect transistor (FET) provided on the (−) line;
    a system contact terminal configured to check whether the external system is connected;
    the BMS; and
    a charge/discharge FET configured to charge or discharge the battery pack under a control of the BMS,
    wherein the pre-charge FET and the charge/discharge FET are connected in parallel,
    wherein, when the battery pack and the external device are connected, the (+) output terminal of the battery pack and the system contact terminal of the battery pack are electrically connected due to a short member provided in the external device, and
    wherein: when the (+) output terminal and the system contact terminal are connected and shorted through the short member, the pre-charge FET is turned on; and when the pre-charge FET is turned on, a voltage of the battery pack is supplied to the BMS through the (+) output terminal and the pre-charge FET, so that the BMS wakes up.

2. The battery pack of claim 1, wherein, after the BMS wakes up, the BMS is further configured to turn off the pre-charge FET.

3. The battery pack of claim 1, wherein, after the BMS wakes up, the BMS is further configured to: check voltage, current, and temperature of the battery, and turn on the charge/discharge FET when all of the voltage, current, and temperature are not abnormal.

4. The battery pack of claim 1, wherein the external device includes any one of: a mobile phone, a tablet computer, a notebook computer, a power tool, a wearable electronic device, and a power storage device, in which the battery pack is mounted.

* * * * *